United States Patent
Kim et al.

(10) Patent No.: US 11,165,087 B2
(45) Date of Patent: Nov. 2, 2021

(54) BATTERY CELL INCLUDING TAB AND LEAD HAVING COMPACT JOINT STRUCTURE

(71) Applicant: LG Chem, Ltd., Seoul (KR)

(72) Inventors: Na Yoon Kim, Daejeon (KR); Hyung-Kyun Yu, Daejeon (KR); Yong-Su Choi, Daejeon (KR); Sang-Hun Kim, Daejeon (KR); Ji-Hoon Lee, Daejeon (KR); Soo-Ji Hwang, Daejeon (KR); Min-Hyeong Kang, Daejeon (KR); Yong Kim, Daejeon (KR)

(73) Assignee: LG Chem, Ltd.

( * ) Notice: Subject to any disclaimer, the term of this patent is extended or adjusted under 35 U.S.C. 154(b) by 104 days.

(21) Appl. No.: 16/070,955

(22) PCT Filed: Nov. 8, 2017

(86) PCT No.: PCT/KR2017/012603
§ 371 (c)(1),
(2) Date: Jul. 18, 2018

(87) PCT Pub. No.: WO2018/088798
PCT Pub. Date: May 17, 2018

(65) Prior Publication Data
US 2019/0036148 A1    Jan. 31, 2019

(30) Foreign Application Priority Data
Nov. 14, 2016    (KR) ........................ 10-2016-0151341

(51) Int. Cl.
*H01M 10/04* (2006.01)
*H01M 10/0525* (2010.01)
(Continued)

(52) U.S. Cl.
CPC ....... *H01M 10/0404* (2013.01); *H01M 10/04* (2013.01); *H01M 10/052* (2013.01);
(Continued)

(58) Field of Classification Search
CPC ...... H01M 10/0404; H01M 2/26; H01M 2/30; H01M 10/04; H01M 10/052; H01M 10/0525
See application file for complete search history.

(56) References Cited

U.S. PATENT DOCUMENTS

| 5,227,266 A | 7/1993 | Shaffer et al. |
| 7,666,542 B2 | 2/2010 | Takamatsu |

(Continued)

FOREIGN PATENT DOCUMENTS

| CN | 103119754 A | 5/2013 |
| CN | 103503196 A | 1/2014 |

(Continued)

OTHER PUBLICATIONS

International Search Report for Application No. PCT/KR2017/012603 dated Feb. 12, 2018, 2 pages.

(Continued)

*Primary Examiner* — Helen Oi K Conley
(74) *Attorney, Agent, or Firm* — Lerner, David, Littenberg, Krumholz & Mentlik, LLP

(57) ABSTRACT

Disclosed herein is a battery cell configured to have a structure in which an electrode assembly is received in a battery case together with an electrolytic solution in the state in which the battery case is sealed and in which a first electrode terminal and a second electrode terminal are located outside the battery case, wherein the electrode assembly is configured to have a structure in which a plurality of first electrode plates and a plurality of second electrode plates are stacked in the state in which separators (Continued)

are interposed respectively between the first electrode plates and the second electrode plates, at least one of the first and second electrode plates includes at least two unit tabs protruding outward from a main body thereof, and unit leads are coupled to the unit tabs in order to form at least one terminal unit.

8 Claims, 3 Drawing Sheets

(51) Int. Cl.
    *H01M 10/052* (2010.01)
    *H01M 50/531* (2021.01)
    *H01M 50/543* (2021.01)

(52) U.S. Cl.
    CPC ..... *H01M 10/0525* (2013.01); *H01M 50/531* (2021.01); *H01M 50/543* (2021.01); *Y02E 60/10* (2013.01); *Y02T 10/70* (2013.01)

(56) References Cited

U.S. PATENT DOCUMENTS

| | | | |
|---|---|---|---|
| 8,491,673 B2 | 7/2013 | Daidoji et al. | |
| 8,628,874 B2 | 1/2014 | Kim | |
| 9,520,589 B2 | 12/2016 | Kim et al. | |
| 2008/0070102 A1 | 3/2008 | Watanabe et al. | |
| 2011/0200866 A1 | 8/2011 | Yun et al. | |
| 2011/0244312 A1 | 10/2011 | Tani et al. | |
| 2012/0164520 A1 | 6/2012 | Choi | |
| 2012/0196173 A1 | 8/2012 | Kim | |
| 2013/0143109 A1* | 6/2013 | Kim | H01M 2/30 429/178 |
| 2013/0295444 A1 | 11/2013 | Kim et al. | |

FOREIGN PATENT DOCUMENTS

| | | |
|---|---|---|
| CN | 104241581 A | 12/2014 |
| EP | 0545399 A1 | 6/1993 |
| EP | 2426758 A1 | 3/2012 |
| EP | 2518794 A1 | 10/2012 |
| JP | 20070027085 A | 2/2007 |
| KR | 20080009350 A | 1/2008 |
| KR | 20080023182 A | 3/2008 |
| KR | 20080034222 A | 4/2008 |
| KR | 20090030202 A | 3/2009 |
| KR | 20120087824 A | 8/2012 |
| KR | 101243591 B1 | 3/2013 |
| KR | 101254691 B1 | 4/2013 |
| KR | 20130138371 A | 12/2013 |
| KR | 20160059789 A | 5/2016 |

OTHER PUBLICATIONS

Supplementary European Search Report for EP Application No. 17870526.5, dated Feb. 4, 2019.

Search Report from Chinese Office Action for Application No. 201780011010.7 dated Sep. 21, 2020; 3 pages.

\* cited by examiner

【FIG. 1】
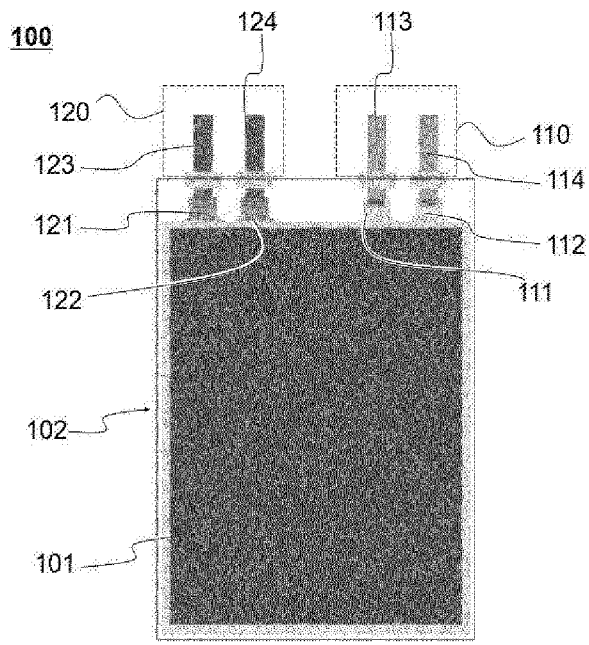
【FIG. 2】
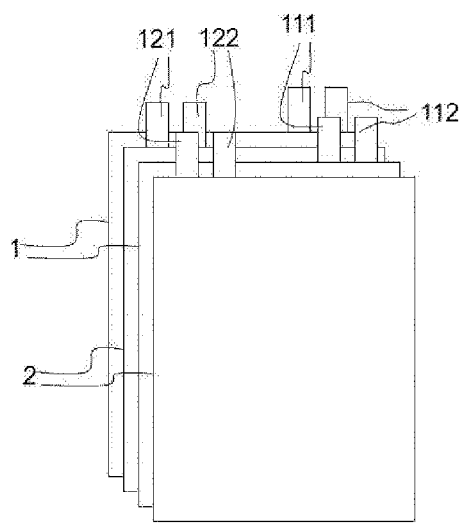

【FIG. 3】
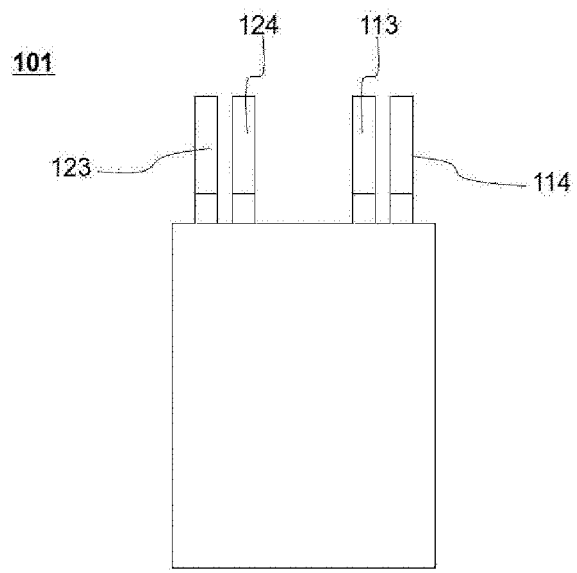
【FIG. 4】
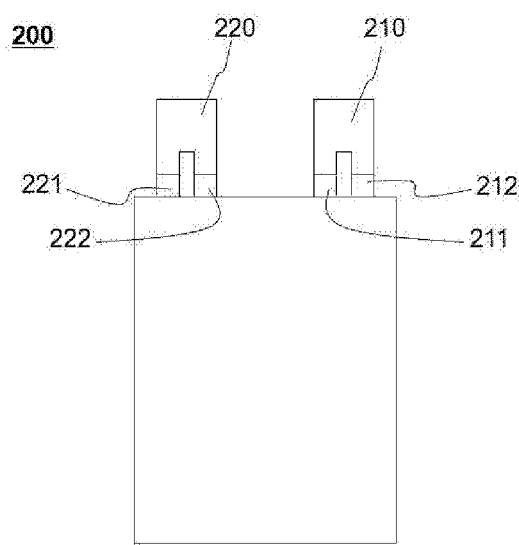

[FIG. 5]
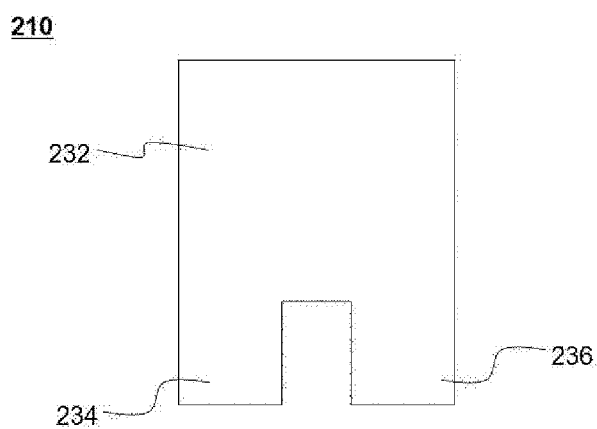
[FIG. 6]
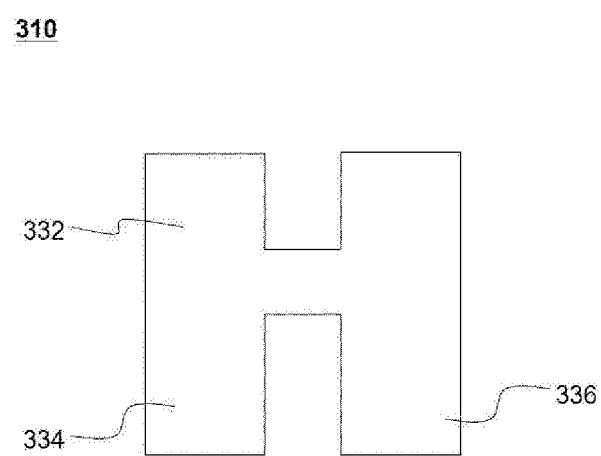

BATTERY CELL INCLUDING TAB AND LEAD HAVING COMPACT JOINT STRUCTURE

CROSS-REFERENCE TO RELATED APPLICATIONS

This application is a national phase entry under 35 U.S.C. § 371 of International Application No. PCT/KR2017/012603, filed Nov. 8, 2017, which claims priority to Korean Patent Application No. 10-2016-0151341, filed Nov. 14, 2016, the disclosures of which are incorporated herein by reference.

TECHNICAL FIELD

The present invention relates to a battery cell including a tab and a lead having a compact joint structure.

BACKGROUND ART

With the remarkable development of information technology (IT), a great variety of portable information communication devices has been popularized. As a result, in the 21$^{st}$ century, we are moving toward a society based on ubiquitous access, in which high-quality information service is available regardless of time or place.

Lithium-based battery cells that can be charged and discharged are very important in realizing such ubiquity. Specifically, lithium battery cells been widely used as energy sources for wireless mobile devices. In addition, lithium secondary batteries have also been used as energy sources for electric vehicles and hybrid electric vehicles, which have been proposed to solve problems, such as air pollution, caused by existing gasoline and diesel vehicles using fossil fuels.

In general, a battery cell is configured to have a structure in which an electrode assembly including a plurality of positive electrodes and a plurality of negative electrode is mounted in a battery case. Such a battery cell includes a pair of positive and negative electrode terminals, via which current from the battery cell flows to the outside.

Meanwhile, a new type of high-output battery cell has been required as the result of popularization of devices that have various designs and require large capacities.

A conventional battery cell is configured such that electrical connection is achieved using a single positive electrode terminal and a single negative electrode terminal. As a result, the configuration of the electrical connection structure between the battery cell and a device is very limited.

In the case in which the battery cell is applied to a device having a slim structure, a circular structure, or a geometrical structure, it is necessary to add an electrical wire or an electrical connection member to the electrical connection structure of the battery cell. As a result, the structure for electrical connection of the battery cell to the device becomes very complicated if a single positive electrode lead and a single negative electrode lead are used.

In addition, when the size of the battery cell is increased such that the battery cell has a large capacity, the size of each of the electrode terminals is also increased. In this case, however, an increase in the coupling area between an electrode tab and an electrode lead constituting each of the electrode terminals is required. As a result, it is difficult to perform a welding or soldering process, which is a common coupling process. In addition, the state of coupling therebetween may not be stable.

Therefore, there is an urgent necessity for technology that is capable of fundamentally solving the above problems.

DISCLOSURE

Technical Problem

The present invention has been made to solve the above problems and other technical problems that have yet to be resolved.

Specifically, it is an object of the present invention to provide a batter cell configured to have a structure in which a unit lead is coupled to each of a plurality of unit tabs in order to constitute an electrode terminal, whereby each of the joint portions of the tabs and the leads is divided into a plurality of parts such that it is possible to easily perform welding or soldering and such that it is possible to configure various structures for electrical connection to a device.

Technical Solution

In accordance with one aspect of the present invention, the above and other objects can be accomplished by the provision of a battery cell that is capable of being repeatedly charged and discharged through the electrical connection of electrode terminals, wherein the battery cell is configured to have a structure in which an electrode assembly is received in a battery case together with an electrolytic solution in the state in which the battery case is sealed and in which a first electrode terminal and a second electrode terminal are located outside the battery case, the electrode assembly is configured to have a structure in which a plurality of first electrode plates and a plurality of second electrode plates are stacked in the state in which separators are interposed respectively between the first electrode plates and the second electrode plates, at least one of the first and second electrode plates includes at least two unit tabs protruding outward from a main body thereof, and unit leads are coupled to the unit tabs in order to form at least one terminal unit, the at least one terminal unit constituting at least one of the electrode terminals of the battery cell.

That is, in the battery cell according to the present invention, a unit lead is coupled to each of a plurality of unit tabs in order to constitute an electrode terminal, whereby each of the joint portions of the tabs and the leads is divided into a unit tab and a unit lead. Consequently, it is possible to easily perform welding or soldering, compared with a structure in which a single lead is coupled to the tabs, which increases the area of the joint portion of the lead and the tabs. In addition, the unit leads are coupled to the unit tabs at relatively small joint portions thereof, whereby the coupling strength therebetween is high.

The battery case may be a pouch-shaped battery case made of a laminate sheet.

Each of the first electrode plates of the electrode assembly may include a first unit tab and a second unit tab, the second unit tab being disposed so as to be parallel to the first unit tab in the state of being spaced apart from the first unit tab.

In a concrete example, the electrode assembly may include a first terminal unit configured such that a first unit lead is coupled to the first unit tabs of the first electrode plates in the state in which the first unit tabs overlap each other in the vertical direction so as to be parallel to each other and a second terminal unit configured such that a second unit lead is coupled to the second unit tabs of the first electrode plates in the state in which the second unit tabs overlap each other in the vertical direction so as to be parallel to each other, and the first terminal unit and the second terminal unit may constitute a first electrode terminal of the battery cell.

The first terminal unit and the second terminal unit may be spaced apart from each other so as to be parallel to each other such that an electrical connection structure of the first electrode terminal is formed at diffePleent positions.

In the battery cell according to the present invention, therefore, current is distributed to two terminal units that can be electrically connected such that the current flows in the battery cell. In addition, the electrical connection structure may be variously configured using terminal units disposed at different positions.

In another concrete example, the electrode assembly may include a terminal unit configured such that a unit lead is coupled to both the first unit tabs and the second unit tabs of the first electrode plates so as to electrically connect the first unit tabs and the second unit tabs to each other in the state in which the first unit tabs overlap each other in the vertical direction so as to be parallel to each other and the second unit tabs overlap each other in the vertical direction so as to be parallel to each other, and the terminal unit may constitute a first electrode terminal of the battery cell.

The unit lead may include a lead body, a first coupling part extending from the lead body, the first coupling part being configured to be coupled to the first unit tabs, and a second coupling part extending from the lead body in the state of being spaced apart from the first coupling part, the second coupling part being configured to be coupled to the second unit tabs.

The lead body may be located outside the battery case. Depending on the circumstances, a portion of the end of the lead body that is opposite the first coupling part and the second coupling part may be recessed toward a space between the first coupling part and the second coupling part.

In a concrete example, each of the first electrode plates may further include n−2 (n≥3) unit tabs, each of the unit tabs may be configured to have a structure identical to the structures of the first unit tab and the second unit tab, and adjacent ones of the unit tabs may be spaced apart from each other so as to be parallel to each other.

Each of the second electrode plates of the electrode assembly may include r (r≥1) unit tabs, and, when r is equal to or greater than 2, adjacent ones of the unit tabs may be spaced apart from each other so as to be parallel to each other.

The r unit tabs may overlap each other in the vertical direction so as to be parallel to each other, a unit lead may be coupled to each of the r unit tabs in order to form r terminal units, and the r terminal units may constitute a second electrode terminal of the battery cell.

A predetermined distance defined in the present invention may be a distance that is equivalent to 1% to 5% of the width of each of the electrode plates.

In the present invention, the kind of the battery cell is not particularly restricted. In a concrete example, the battery cell may be a lithium secondary battery, such as a lithium ion (Li-ion) secondary battery, a lithium polymer (Li-polymer) secondary battery, or a lithium ion polymer (Li-ion polymer) secondary battery, which exhibits high energy density, discharge voltage, and output stability.

In general, a lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and/or a positive electrode current collecting extension and drying the mixture. A filler may be further added to the mixture as needed.

In general, the positive electrode current collector and/or the positive electrode current collecting extension is manufactured so as to have a thickness of 3 to 500 μm. The positive electrode current collector and/or the positive electrode current collecting extension is not particularly restricted, as long as the positive electrode current collector and/or the positive electrode current collecting extension exhibits high conductivity while the positive electrode current collector and/or the positive electrode current collecting extension does not induce any chemical change in a battery to which the positive electrode current collector and/or the positive electrode current collecting extension is applied. For example, the positive electrode current collector and/or the positive electrode current collecting extension may be made of stainless steel, aluminum, nickel, titanium, or plastic carbon. Alternatively, the positive electrode current collector and/or the positive electrode current collecting extension may be made of aluminum or stainless steel, the surface of which is treated with carbon, nickel, titanium, or silver. In addition, the positive electrode current collector and/or the positive electrode current collecting extension may have a micro-scale uneven pattern formed on the surface thereof so as to increase the force of adhesion of the positive electrode active material. The positive electrode current collector and/or the positive electrode current collecting extension may be configured in various forms, such as a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode active material to a negative electrode current collector and/or a negative electrode current collecting extension and drying the same. The above-described components may be selectively added to the negative electrode active material as needed.

In general, the negative electrode current collector and/or the negative electrode current collecting extension is manufactured so as to have a thickness of 3 to 500 μm. The negative electrode current collector and/or the negative electrode current collecting extension is not particularly restricted, so long as the negative electrode current collector and/or the negative electrode current collecting extension exhibits high conductivity and the negative electrode current collector and/or the negative electrode current collecting extension does not induce any chemical change in a battery to which the negative electrode current collector and/or the negative electrode current collecting extension is applied. For example, the negative electrode current collector and/or the negative electrode current collecting extension may be made of copper, stainless steel, aluminum, nickel, titanium, or plastic carbon. Alternatively, the negative electrode current collector and/or the negative electrode current collecting extension may be made of copper or stainless steel, the surface of which is treated with carbon, nickel, titanium, or silver, or an aluminum-cadmium alloy. In addition, the negative electrode current collector and/or the negative electrode current collecting extension may have a microscale uneven pattern formed on the surface thereof so as to increase the force of adhesion of the negative electrode active material, in the same manner as the positive electrode current collector and/or the positive electrode current collecting extension. The negative electrode current collector and/or the negative electrode current collecting extension may be configured in various forms, such as a film, a sheet, a foil, a net, a porous body, a foam body, and a non-woven fabric body.

As the negative electrode active material, for example, there may be used carbon, such as a non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; a conductive polymer, such as polyacetylene; or a Li—Co—Ni based material.

The separator is interposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The electrolytic solution may be a non-aqueous electrolytic solution containing lithium salt, which is composed of a non-aqueous electrolytic solution and lithium salt. A non-aqueous organic solvent, an organic solid electrolyte, or an inorganic solid electrolyte may be used as the non-aqueous electrolytic solution. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. Depending on the circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas. Moreover, fluoro-ethylene carbonate (FEC) and propene sultone (PRS) may be further included.

In a concrete example, lithium salt, such as $LiPF_6$, $LiClO_4$, $LiBF_4$, or $LiN(SO_2CF_3)_2$, may be added to a mixed solvent of a cyclic carbonate, such as EC or PC, which is a high dielectric solvent, and a linear carbonate, such as DEC, DMC, or EMC, which is a low viscosity solvent, to prepare a non-aqueous electrolyte containing lithium salt.

In accordance with other aspects of the present invention, there are provided a battery pack including at least one battery cell that is configured as described above and a device including the battery pack.

BRIEF DESCRIPTION OF DRAWINGS

The above and other objects, features and other advantages of the present invention will be more clearly understood from the following detailed description taken in conjunction with the accompanying drawings, in which:

FIG. 1 is a schematic view of a battery cell according to an embodiment of the present invention;

FIG. 2 is an exploded view of an electrode assembly;

FIG. 3 is a plan view of the electrode assembly;

FIG. 4 is a schematic plan view of an electrode assembly according to another embodiment of the present invention;

FIG. 5 is a plan view of a unit lead shown in FIG. 4; and

FIG. 6 is a plan view of a unit lead according to another embodiment of the present invention.

BEST MODE

Now, exemplary embodiments of the present invention will be described in detail with reference to the accompanying drawings. It should be noted, however, that the illustrated embodiments are given for easier understanding of the present invention, and thus the scope of the present invention is not limited by the illustrated embodiments.

FIG. 1 is a schematic view of a battery cell according to an embodiment of the present invention. FIG. 2 is an exploded view of an electrode assembly, and FIG. 3 is a plan view of the electrode assembly.

Referring to these figures, the battery cell, denoted by reference numeral 100, is configured to have a structure in which an electrode assembly 101 is received in a battery case 102 together with an electrolytic solution in the state in which the battery case 102 is sealed and in which a first electrode terminal 110 and a second electrode terminal 120 are located outside the battery case 102.

The electrode assembly 101 is configured to have a structure in which a plurality of first electrode plates 1 and a plurality of second electrode plates 2 are stacked in the state in which separators (not shown) are interposed respectively between the first electrode plates 1 and the second electrode plates 2.

Each of the first electrode plates 1 and the second electrode plates 2 includes a pair of unit tabs 111 and 112 or 121 and 122 protruding outward from a main body thereof.

Specifically, each of the first electrode plates 1 of the electrode assembly 101 includes a first unit tab 111 and a second unit tab 112, which is disposed so as to be parallel to the first unit tab 111 in the state of being spaced apart from the first unit tab 111.

Each of the second electrode plates 2 of the electrode assembly 101 includes a first unit tab 121 and a second unit tab 122, which is disposed so as to be parallel to the first unit tab 121 in the state of being spaced apart from the first unit tab 121.

The electrode assembly 101 includes a first terminal unit configured such that a first unit lead 113 is coupled to the first unit tabs 111 of the first electrode plates 1 in the state in which the first unit tabs 111 overlap each other in the vertical direction so as to be parallel to each other and a second terminal unit configured such that a second unit lead 114 is coupled to the second unit tabs 112 of the first electrode plates 1 in the state in which the second unit tabs 112 overlap each other in the vertical direction so as to be parallel to each other.

The first terminal unit and the second terminal unit for the first electrode plates have the same polarity. These terminal units constitute the first electrode terminal 110 of the battery cell 100.

The electrode assembly 101 also includes a first terminal unit configured such that a first unit lead 123 is coupled to the first unit tabs 121 of the second electrode plates 2 in the state in which the first unit tabs 121 overlap each other in the vertical direction so as to be parallel to each other and a second terminal unit configured such that a second unit lead 124 is coupled to the second unit tabs 122 of the second electrode plates 2 in the state in which the second unit tabs 122 overlap each other in the vertical direction so as to be parallel to each other.

The first terminal unit and the second terminal unit for the second electrode plates 2 have the same polarity. These terminal units constitute the second electrode terminal 120 of the battery cell 100.

As described above, the first terminal unit and the second terminal unit for the first electrode plates and the first terminal unit and the second terminal unit for the second electrode plates are spaced apart from each other so as to be parallel to each other such that electrical connection can be achieved at different positions.

FIG. 4 is a schematic plan view of an electrode assembly according to another embodiment of the present invention, and FIG. 5 is a plan view of a unit lead shown in FIG. 4.

Referring to these figures, the electrode assembly, denoted by reference numeral 200, includes a terminal unit configured such that a first unit lead 210 is coupled to both first unit tabs 211 and second unit tabs 212 of the first electrode plates so as to electrically connect the first unit tabs 211 and second unit tabs 212 to each other in the state in which the first unit tabs 211 overlap each other in the vertical direction so as to be parallel to each other and the second unit tabs 212 overlap each other in the vertical direction so as to be parallel to each other. The electrode assembly 200 also includes a terminal unit configured such that a second unit lead 210 is coupled both to first unit tabs 221 and to second unit tabs 222 of the second electrode plates so as to electrically connect the first unit tabs 221 and second unit tabs 222 to each other in the state in which the first unit tabs 221 overlap each other in the vertical direction so as to be parallel to each other and the second unit tabs 222 overlap each other in the vertical direction so as to be parallel to each other.

In FIG. 5, the unit lead 210 includes a lead body 232, a first coupling part 234 extending from the lead body 232, the first coupling part 234 being configured to be coupled to the first unit tabs 211, and a second coupling part 236 extending from the lead body 232 in the state of being spaced apart from the first coupling part 234, the second coupling part 236 being configured to be coupled to the second unit tabs 212.

FIG. 6 shows a unit lead having a structure different from the structure of the unit lead described above.

Referring to FIG. 6, the unit lead, denoted by reference numeral 310, includes a lead body 332, a first coupling part 334 extending from the lead body 332, and a second coupling part 336 extending from the lead body 332 in the state of being spaced apart from the first coupling part 334. A portion of the end of the lead body 332 that is opposite the first coupling part 334 and the second coupling part 336 is recessed toward the space between the first coupling part 334 and the second coupling part 336.

INDUSTRIAL APPLICABILITY

As is apparent from the above description, in the battery cell according to the present invention, a unit lead is coupled to each of a plurality of unit tabs in order to constitute an electrode terminal, whereby each of the joint portions of the tabs and the leads is divided into a unit tab and a unit lead. Consequently, it is possible to perform welding or soldering more easily that in the case of a structure in which a single lead is coupled to the tabs, whereby the area of the joint portion of the lead and the tabs is large. In addition, the unit leads are coupled to the unit tabs at relatively small joint portions thereof, whereby the coupling strength therebetween is high.

The invention claimed is:

1. A battery cell that is capable of being repeatedly charged and discharged through electrical connection of electrode terminals, wherein
the battery cell is configured to have a structure in which an electrode assembly is received in a battery case together with an electrolytic solution in a state in which the battery case is sealed and in which a first electrode terminal and a second electrode terminal are located outside the battery case,
the electrode assembly is configured to have a structure in which a plurality of first electrode plates and a plurality of second electrode plates are stacked along a stacking direction in a state in which separators are interposed respectively between the first electrode plates and the second electrode plates, wherein the first electrode plates are negative electrodes and the second electrode plates are positive electrodes,
at least one of the first electrode plates and at least one of the second electrode plates respectively comprises at least two unit tabs protruding outward from a main body thereof, and
unit leads are coupled to the unit tabs in order to form at least one terminal unit, the at least one terminal unit constituting at least one of the electrode terminals of the battery cell,
wherein each of the first electrode plates and the second electrode plates of the electrode assembly comprises a first unit tab and a second unit tab, the second unit tab being disposed so as to be parallel to the first unit tab in a state of being spaced apart from the first unit tab along a width direction orthogonal to the stacking direction,
wherein the first unit tab and the second unit tab of the first electrode plates and the first unit tab and the second unit tab of the second electrode plates protrude outward from a same side of the first electrode plates and the second electrode plates,
the electrode assembly comprises a terminal unit configured such that a unit lead is coupled to both the first unit tabs and the second unit tabs of the first electrode plates so as to electrically connect the first unit tabs and second unit tabs to each other in a state in which the first unit tabs overlap each other in the stacking direction so as to be parallel to each other and the second unit tabs overlap each other in the stacking direction so as to be parallel to each other,
wherein the unit lead comprises a lead body wherein the lead body has a H shape,
wherein the unit lead further comprises:
a first coupling part extending from the lead body, the first coupling part being configured to be coupled to the first unit tabs; and
a second coupling part extending from the lead body in a state of being spaced apart from the first coupling part in the width direction, the second coupling part being configured to be coupled to the second unit tabs,
wherein a portion of an end of the lead body that is opposite the first coupling part and the second coupling part is recessed toward a space between the first coupling part and the second coupling part.

2. The battery cell according to claim 1, wherein the electrode assembly comprises:
a first terminal unit configured such that a first unit lead is coupled to the first unit tabs of the first electrode plates in a state in which the first unit tabs overlap each other in the stacking direction so as to be parallel to each other; and
a second terminal unit configured such that a second unit lead is coupled to the second unit tabs of the first electrode plates in a state in which the second unit tabs overlap each other in the stacking direction so as to be parallel to each other, and wherein
the first terminal unit and the second terminal unit constitute a first electrode terminal of the battery cell.

3. The battery cell according to claim 2, wherein the first terminal unit and the second terminal unit are spaced apart from each other so as to be parallel to each other such that an electrical connection structure of the first electrode terminal is formed at different positions.

4. The battery cell according to claim 1, wherein
the terminal unit constitutes a first electrode terminal of the battery cell.

5. The battery cell according to claim 1, wherein the lead body is located outside the battery case.

6. The battery cell according to claim 1, wherein
each of the first electrode plates further comprises n−2 (n≥3) unit tabs,
each of the unit tabs is configured to have a structure identical to structures of the first unit tab and the second unit tab, and
adjacent ones of the unit tabs are spaced apart from each other so as to be parallel to each other.

7. The battery cell according to claim 1, wherein
each of the second electrode plates of the electrode assembly comprises r (r≥1) unit tabs, and
when r is equal to or greater than 2, adjacent ones of the unit tabs are spaced apart from each other so as to be parallel to each other.

8. The battery cell according to claim 7, wherein the r unit tabs overlap each other in a stacking direction so as to be parallel to each other, a unit lead is coupled to each of the r unit tabs in order to form r terminal units, and the r terminal units constitute a second electrode terminal of the battery cell.

* * * * *